United States Patent [19]

Hammett

[11] 4,083,258

[45] Apr. 11, 1978

[54] WALL PATCHING APPARATUS

[76] Inventor: Joseph Richard Hammett, 7032 Allentown Rd., Camp Springs, Md. 20031

[21] Appl. No.: 712,918

[22] Filed: Aug. 9, 1976

[51] Int. Cl.$^2$ .............................................. F16H 27/02

[52] U.S. Cl. .................................... 74/89.15; 85/3 R; 29/259

[58] Field of Search ...................... 85/3 R; 248/217 R; 29/259; 74/59.15

[56] References Cited

U.S. PATENT DOCUMENTS

| | | | |
|---|---|---|---|
| 3,078,556 | 2/1963 | Carroll | 29/259 |
| 3,270,407 | 9/1966 | Araujo | 29/259 |

*Primary Examiner*—Benjamin W. Wyche
*Assistant Examiner*—Wesley S. Ratliff, Jr.

[57] ABSTRACT

A tripod stand and tension screw rod are employed to position and hold a backing plate of varying dimensions to facilitate repair of holes in hollow wall construction such as gypsum board.

6 Claims, 5 Drawing Figures

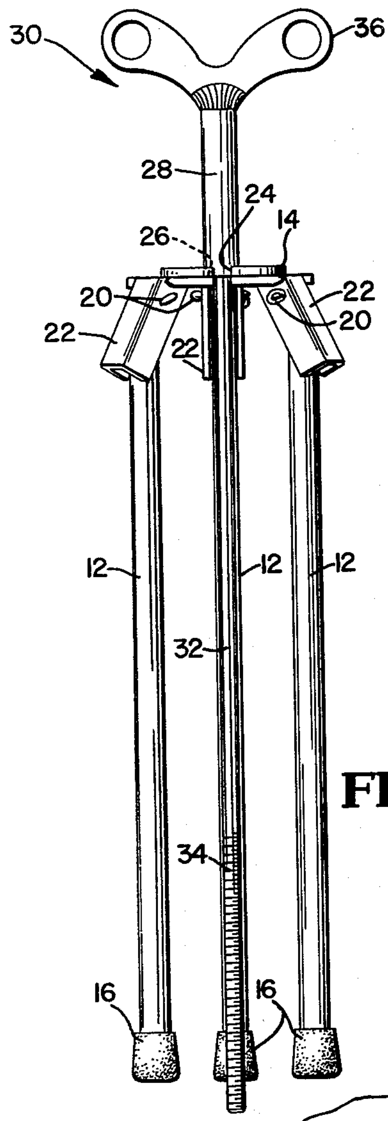
FIG. 1
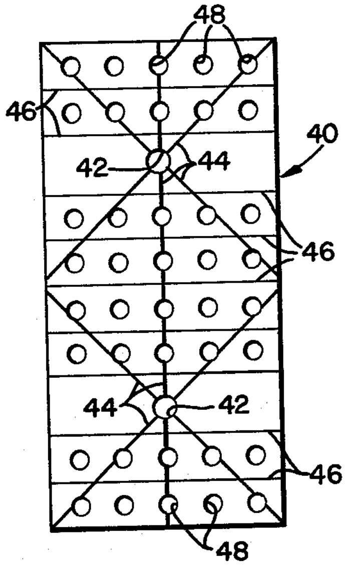
FIG. 2
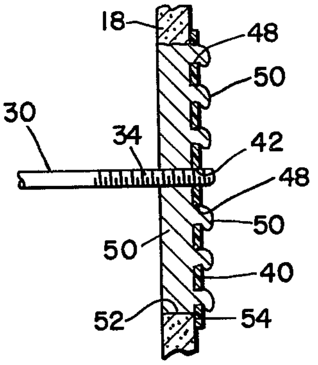
FIG. 5
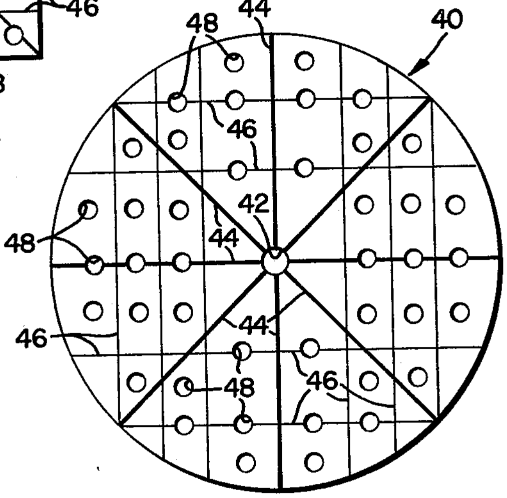
FIG. 3
FIG. 4
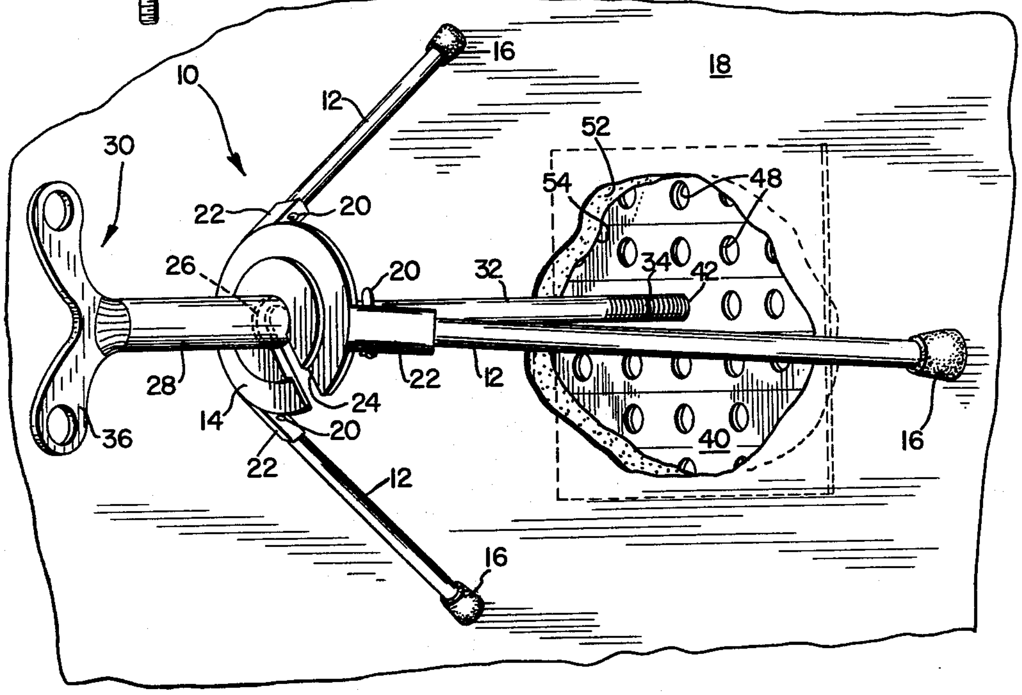

WALL PATCHING APPARATUS

BACKGROUND OF THE INVENTION

Repair of sizable holes in hollow core walls such as gypsum board, furred plaster, or similar constructions has long been a time consuming and unsatisfying job. Holes may be caused by redecoration or repair, vandalism or moving accidents, among other causes, and often are too large to bridge with patching compounds to return the wall to a sound condition. Various methods are commonly employed to provide a backing for the patching material such as screen wire, or crumpled newspaper which are both time consuming, wasteful of material and generally produce a less than desirable end result, being more susceptible than other portions of the wall to future cracking.

SUMMARY OF THE INVENTION

A device is herein presented to aid in restoration of holes in hollow walls to a sound condition with a minimum of expenditure in time, effort and materials. The device comprises a tripod or similarly configured positioning device for supporting a backing plate bridging the hole behind the gypsum board or other surface. The backing plate is made in a manner which allows it to be easily configured to a shape which will fit through the hole to the hollow core area and completely bridge the hole from the rear. The patching material may then be applied over the backing plate extruding through holes in the backing plate to anchor the patch to the remaining wall. Removal of the positioning device from the backing plate and filling the resultant small hole completes the patch.

BRIEF DESCRIPTION OF THE DRAWING

Details of the preferred embodiments and the principles of the invention will be made clear by examination of the following description and accompanying drawing in which:

FIG. 1 is a side elevational view of a positioning device constructed in accordance with the principles of the present invention;

FIG. 2 is a plan view of one embodiment of a backing plate constructed in accordance with the present invention;

FIG. 3 is a plan view of a second embodiment of a backing plate of the present invention;

FIG. 4 is a perspective view of the positioning device and backing plate in position for the patching of a hole in a wall; and FIG. 5 is a side elevational view of a postion of the positioning device and backing plate of the present invention, showing the patching of a hole in a wall in accordance with the present invention.

DESCRIPTION OF THE PREFERRED EMBODIMENTS

As shown in FIGS. 1 and 4, a tripod or similarly configured positioning device 10 is provided comprised of legs 12 radially positioned about a central platform or portion 14. The legs 12 may be made from metal, plastic or other suitable materials and preferably are provided with soft tips 16 which will not mark or easily slip on the wall surface 18. The legs 12 preferably are pivotally mounted by means of pins 20 or similar fastenings to anchor points 22 on the central platform 14. The anchor points 22 may be formed as an integral part of the central platform 14 as shown, and preferably limit the outward rotation of the legs 12 to a convenient angle which forms the stable base required for the use of the present invention.

The central platform 14 may be formed of metal, plastic or another material of suitable structural integrity and is provided with a slot 24 and central aperture 26 or similar positioning means for locating the flange or enlarged head portion 28 of a tensioning screw 30.

The tensioning screw 30 preferably is formed of metal or another suitable material for long service life and comprises an elongated rod or shaft 32 terminating at one end in a threaded section 34 and at the opposite end in the head portion 28 and handle 36 suitable for manipulation and tightening by hand. Preferably, the shaft 32 slides freely within the slot 24 and aperture 26 in the central platform 14.

The backing plate 40 of the present invention may be made in a variety of shapes such as shown in FIGS. 2 and 3. The backing plate 40 is provided with a hole or holes 42 with which to engage the threaded section 34 of the sentioning screw 30. The backing plate 40 may be made from lightweight sheet metal, plastic, or another suitable material, and is provided with ribs or corrugations 44 for added rigidity. The backing plate 40 preferably is scored as indicated at 46 in a pattern that will allow for the breaking of various sections from the plate 40 to enable its use with various sized and shaped holes. Holes 48 are provided in the backing plate 40 at suitable intervals which allow the patching material 50 to extrude slightly through the plate 40 and grip the rear of the plate, as shown in FIG. 5.

In operation, a hole 52 in a hollow wall 18 is first cleaned of damaged material around the edges and rear surface 54. A convenient-sized backing plate 40 is chosen and sections are broken off along score lines 46 as required so that the backing plate 40 will slide freely through the hole 52.

The threaded end 34 of the tensioning screw 30 is started through a hole 42 in the backing plate 40. The backing plate 40 is then inserted through the hole 52 in the wall 18 and rotated or positioned to cover the entire hole 52. The tripod 10 is erected over the hole 52 with the tips 16 of the legs 10 resting against the areas of the wall 18 surrounding the hole 52.

The shaft 32 of the tension screw 30 is passed through the slot 24 and the head portion 28 is positioned in the aperture 26 in the central platform 14 of the tripod 10. Thereafter, the handle 36 on the tensioning screw 30 is turned until the backing plate 40 is securely positioned against the back 54 of the hole 52.

As shown in FIG. 5, patching material 50 may then be used to fill the hole 52 to match the remaining wall 18. Small amounts of the patching material 50 extrude through the holes 48 in the backing plate 40 which, when dry, forms a secure bond between the patching material 50 and the backing plate 40.

When the patching material 50 has dried, the tensioning screw 30 is rotated out of the backing plate 40 and the tripod is removed. The small hole left by the removal of the tensioning screw 30 is then patched, and the repaired wall 18 is ready for refinishing in any desired manner.

What is claimed is:

1. Apparatus for patching a hole in a wall, comprising:

a backing plate adapted to be positioned over the hole in engagement with the rear surface of the wall surrounding the hole for receiving patching material thereon, said backing plate having a plurality of perforations therethrough, and support means engageable with the front surface of said wall and adapted to be removably secured to said backing plate for supporting it in a position over the hole for the receipt of patching material thereon, said support means comprising a rotatable rod having a threaded end adapted to be threadably received within said perforation for supporting said backing plate, and a plurality of movable legs connected to said rod and engageable with the front surface of the wall surrounding the hole, whereby said support means serves to support said backing plate over the hole before and during the application of patching material on said backing plate for patching the hole, and said support means may be removed from said backing plate by rotation of the threaded portion of said rod out of said perforation in said backing plate after the application of patching material thereon.

2. The apparatus of claim 1 wherein said backing plate is provided with score lines defining removable sections thereof.

3. The apparatus of claim 2 wherein said backing plate is provided with corrugations for added rigidity.

4. The apparatus of claim 1 wherein a handle is provided on said rod at the end opposite to said threaded end.

5. The apparatus of claim 1 wherein said support means comprises a central portion to which said legs are pivotally connected at one end and on which said rod is rotatably mounted.

6. The apparatus of claim 5 wherein said central portion has a slot in which said rod is slidably and rotatably received.

* * * * *